June 30, 1970     W. TURNER     3,518,091
CUP-SHAPED BREAD OR CAKE AND INTEGRAL CUP
Filed April 3, 1969     2 Sheets-Sheet 1
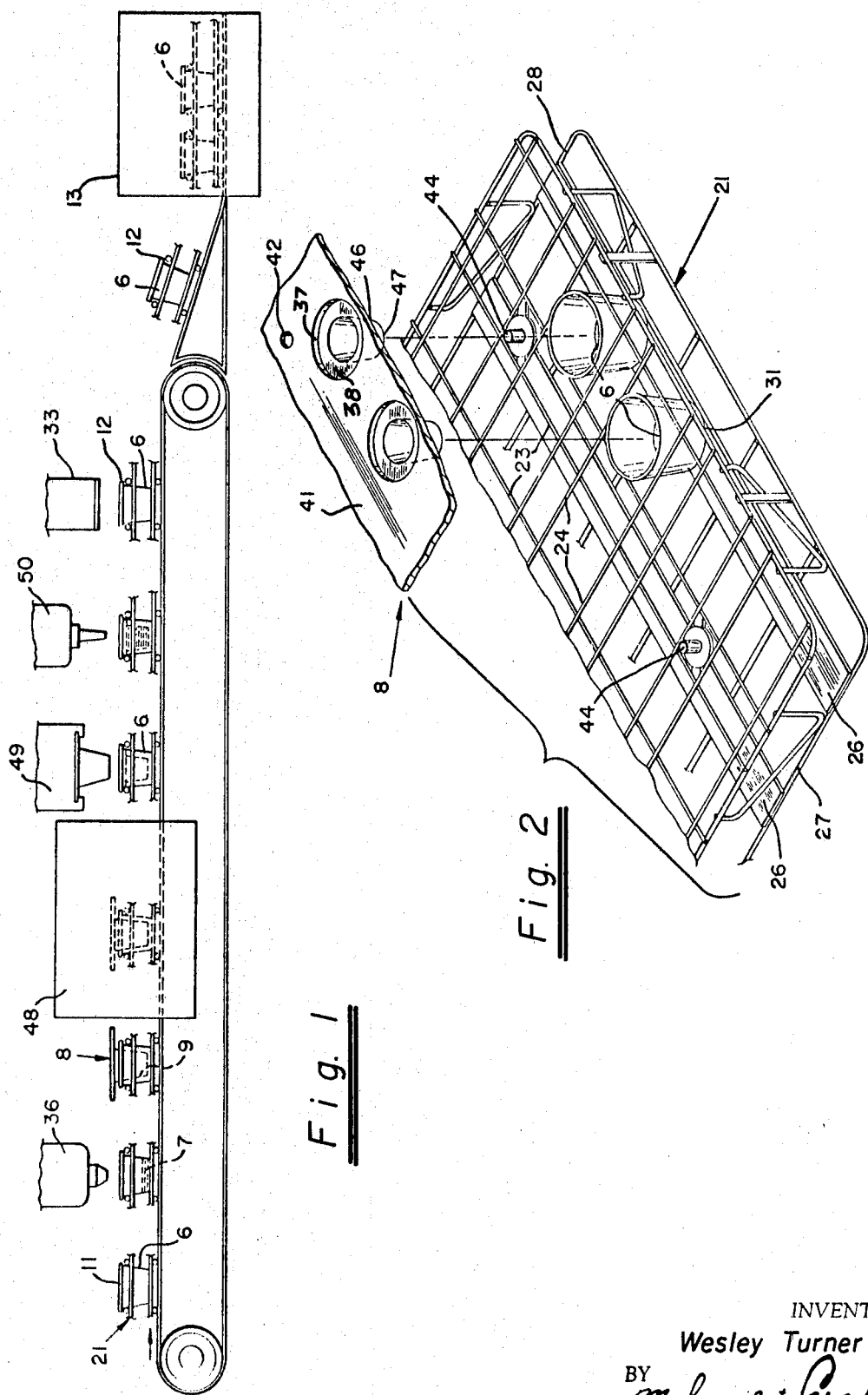
INVENTOR.
Wesley Turner
Attorneys

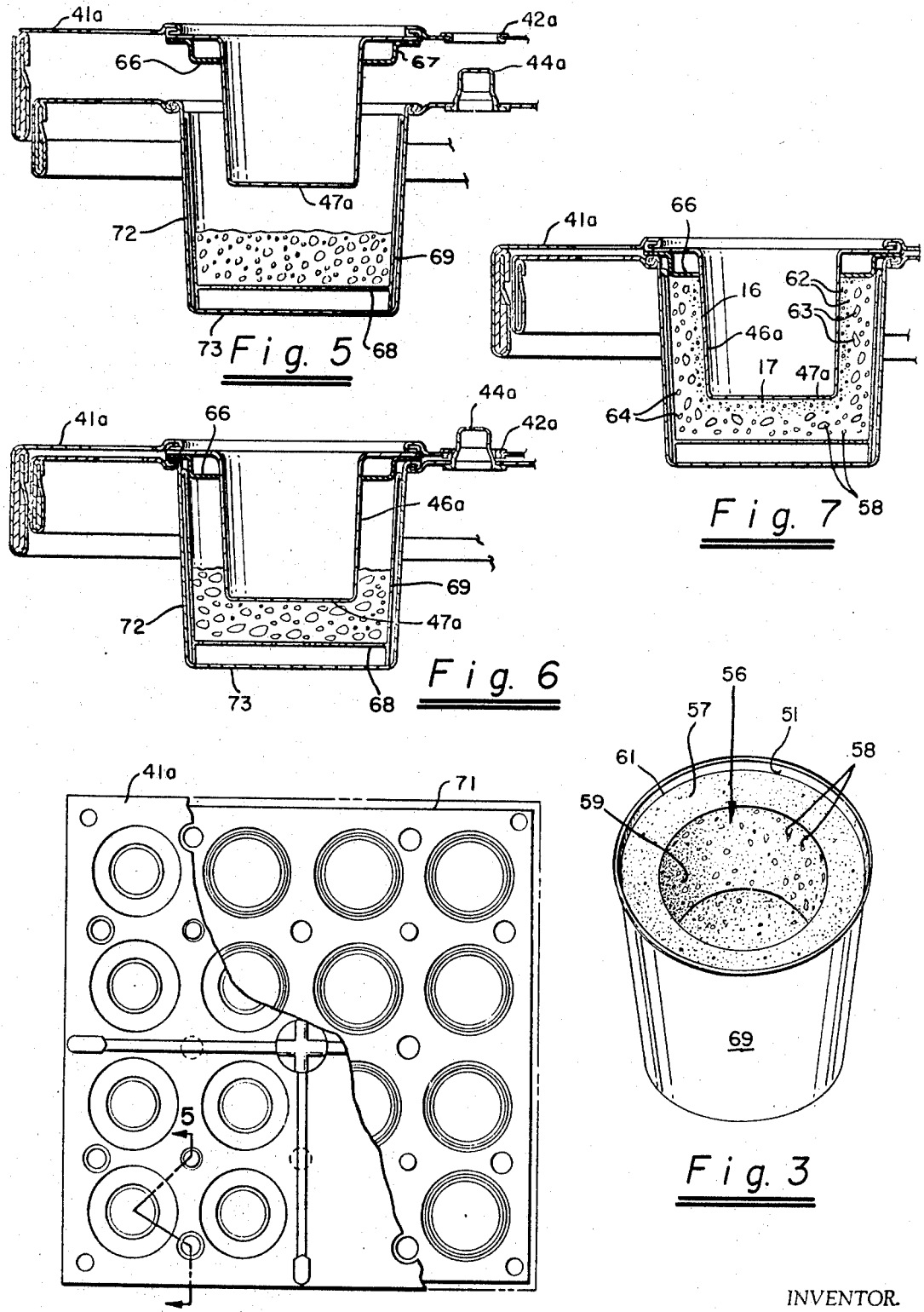

United States Patent Office 3,518,091
Patented June 30, 1970

3,518,091
CUP-SHAPED BREAD OR CAKE
AND INTEGRAL CUP
Wesley Turner, 906 Curtis St.,
Albany, Calif. 94707
Continuation-in-part of application Ser. No. 502,192,
Oct. 22, 1965. This application Apr. 3, 1969, Ser.
No. 813,249
Int. Cl. A21d 8/06
U.S. Cl. 99—88                                  2 Claims

ABSTRACT OF THE DISCLOSURE

An article comprising a paper cup and a cake or bread baked in the cup, the baked product having a base and upstanding side walls forming a food filling cavity, the inner surface of the walls and base being relatively denser than the inner portions of the baked product providing an impervious surface to certain liquid fillings, the inner portions of the baked product being light and moist, and the portions adjacent the paper cup being less dense than the inner surface but more dense than the inner portions and clinging to the paper cup. The method of baking the product in which the inner surface is baked faster and more thoroughly because of contact with a metal core, and the outer surface being baked more slowly because of the time lag caused by the thermal insulation of the paper cup.

BACKGROUND OF THE INVENTION

This application is a continuation in part of my application Ser. No. 502,192 filed Oct. 22, 1965 now abandoned. The prior art shows baked products which have been baked in all metal containers or all paper containers. The common cup-cake is an example of a product which is baked in an all paper container in which only paper is in intimate contact with the product during baking.

SUMMARY OF THE INVENTION

The gist of this invention is the discovery that by baking a dough or cake batter in a paper container and inserting a metal male mold into the container to form an open cavity in the product during baking a new product is created having three distinct zones having different densities. The inner wall of the baked product is the most dense and most impervious to fillings placed in the baked product such as liquid ice cream or hot foods such as chile cone carne. The inner portions of the bake product is the zone being most porous and light. The zone next to the paper container is of intermediate density.

An object of the present invention is to produce a baked cake product having unique characteristics for receiving a liquid ice cream filling.

Another object is to provide a tasty yet economical combination ice cream and cake product in which the same paper container is used for baking the cake and for holding the food until it is ultimately eaten by the consumer.

A further object is to bake a similarly shaped bread product for holding hot or cold foods.

A still further object is to bake the foregoing products by a method which does not scorch the paper container so that advertising printed on the outer wall of the container will remain bright and attractive.

Another object is to provide a bread or cake product with a filling which remains in a paper container from the time it is inserted into the container, baked, filled with a filling material, stored, transported and finally eaten, providing the ultimate in sanitary conditions.

Still another object is to provide a product which is economical to produce.

BRIEF DECRIPTION OF THE DRAWINGS

FIG. 1 is a schematic of an assembly line illustrating a method of producing cakes or bread in accordance with the present invention.

FIG. 2 is a perspective view of apparatus constructed in accordance with the present invention for holding the cups during baking.

FIG. 3 is an enlarged perspective view of the paper cup and integral cake or bread after baking.

FIG. 4 is a plan view of an alternate form of the baking apparatus with portions removed for purposes of clarity.

FIG. 5 is an enlarged exploded cross-section of a portion of the pan shown in FIG. 4 and taken substantially along the line 5—5.

FIG. 6 is a view similar to that of FIG. 5 showing the core pan depressed in the raw dough or batter just before baking.

FIG. 7 is a view similar to that of FIG. 5 showing the product in the fully baked condition.

BRIEF DESCRIPTION OF THE PREFERRED EMBODIMENTS OF THE INVENTION

The invention consists briefly on a non-edible cup-shaped paper container having sufficient thickness and rigidity to function as a female mold for baking an edible cake or bread within, said container having an outer wall surface suitable for receiving and retaining markings made by the graphic arts during baking and an inner wall to which a baked cake will cling slightly so that it will hold the cake while a core mold is being released and will also release from the wall by the action of a spoon; a cake or bread baked in the container and having bottom and side walls in contact with the container, the cake being formed with an open ended cavity with the walls diverging in the direction of the cavity, the base and walls having a thickness of less than one inch enabling quick baking; and the inner surface of the cake or bread article being characterized by a more thoroughly baked surface which is more dense and provides a relatively greater resistance to liquid penetration than the interior portions of the cake or bread and the outer surface being characterized by a surface which is more thoroughly baken than the inner portions of the cake or bread but less thoroughly baken than the inner surface and less dense than the inner surface.

The metal core pan used to bake the product is greased to enhance its releasing characteristics. In addition, greasing the core pan causes the inner surface of the cake or bread to be glazed from its contact with the greased hot metal surface thereby increasing the resistance of the inner wall surface to liquid penetration.

It has been found that it is preferably to make the bottom of the article thicker than the width of the upstanding walls. For example, the bottom of the cup may be about ½ inch thick and the upstanding walls ¼ inch thick.

The method of making the article of the present invention consists briefly of: selecting an upstanding non-edible cup-shaped container 6 having qualities permitting it to be baked without burning or scorching and frozen without cracking and having sufficient rigidity to permit the container to be hand-held while the contents are consumed; filling the container with a preselected quantity of liquid raising batter 7; inserting a core member 8 into the container forming a cup-shaped chamber 9 with the container; baking the batter for a pre-selected time until the resulting edible product substantially fills the chamber within a predetermined distance from the rim 11 of the container; and removing the core member from the container.

The above method produces a cup which is a marketable item and may be filled with a dessert at a much later time. It is, however, a simple matter to add the additional step of filling the cup-shaped cake with a dessert filling on the same assembly line with a dessert loading apparatus 50 immediately after the removal of the core mold by a core mold removing apparatus 49 schematically depicted in FIG. 1.

The article is ready for serving immediately after filling or it may be capped with a plastic or other suitable cap 12 and moved directly into a freezer 13. After freezing, the article can be distributed to warehouses, retail outlets, etc.

The cake produced by the aforesaid process is eaten directly from the same container in which it was baked and shipped thereby resulting in substantial savings in labor and handling. I have found that the standard "hot cup" non-waxed paper container manufactured by such companies as Lily and designated #1 white sulfite stock provides an excellent receptacle for the cake. The cup may also be coated with a thin layer of plastic material as is common in beverage cups. This coating prevents the product from having a "paper taste" and assists in releasing the product from the wall of the paper cup when it is eaten. Heretofore, paper has been thought unsuitable as a material for baking and distributing baked goods because of its tendency to scorch and discolor in the baking step. The problem has been the inability to bake products the whole way through before the paper scorched. I have found that by inserting a core mold in the interior of the cup and thereby forming a chamber in the shape of a cup with upstanding walls 16 and a base 17, baking occurs quickly throughout the entire product before the paper becomes scorched because no part of the product exceeds about an inch in thickness. It is believed that the moisture in the batter is absorbed by the paper in sufficient quantity for the short baking time to assist in preventing scorching.

A baking time of about ten to twelve minutes in a preheated oven at about 350 degrees Fahrenheit has proved successful in even baking cake or bread in containers which are printed in color to insure an attractive container for retailing the product. A somewhat shorter baking time is possible with an oven at higher temperatures and likewise the product can be baked at lower temperatures provided baking time is extended.

An important feature of the present invention is the fact that the paper cups may be baked in the oven without any outer shielding. The method of baking is to place the cups in an open frame 21 exposing the paper container directly to the hot gasses of the oven.

A suitable frame is shown in FIG. 2 which consists of a series of parallel wires 23 intersecting a series of right angularly related wires 24 forming a plurality of spaced stations for receiving and firmly holding a container. A plurality of bottom rails 26 joined to the sides 27 and 28 receive the bottom edge 31 of the container so as to hold the rim above the frame so that it may be capped by a capping machine 33 as shown schematically in FIG. 1.

Another way of supporting the containers is to provide a sheet pan formed with recesses dimensioned to receive the bottom of the cups.

Equipment is commercially available to measure out a precise amount of batter to a plurality of containers and is here shown schematically in FIG. 1 as a device 36 mounted above the container.

The core mold here consists of a top frame 41 formed with openings 42 for receiving indexing stubs 44 for centering the plurality of cup-shaped molds having tapered side walls 46 and bottoms 47. The molds, as may be noted are open at the top so as to permit the hot gasses to penetrate more effectively to the inner surfaces of the cake. In order to precisely center the cups and to serve as a stop to the raising batter or dough, the core mold is formed with a shoulder 37 and a depressed annular ring 38.

The oven 48 should be of a type that distributes the heat evenly to each container and to each part of the container.

The above method may be used in baking bread, corn bread or cake. The bread dough is formed by kneading flour, water, a leavening agent and salt. These ingredients are combined by a mechanical mixer until the dough assumes a smooth consistency. In this mixing action the water combines with the protein of the flour to form a plastic gluten which retains the gas subsequently generated in a cellular structure. Conventional bakery equipment for mixing the ingredients and dispensing measured dough quantities such as the "Pan-O-Mat" equipment may be used for present purposes. Preferably a type of chemical leavening agent is selected which is relatively inactive at the lower temperatures and so produces very little action until the dough is placed in the oven. A preferred leavening agent in the case of the bread cup is the combination of sodium bicarbonate and sodium aluminum phosphate-mono calcium phosphate blend (ACTIF. 8) in the proportions of about 0.7% and 0.8% respectively of the total dry mix not including water or yeast. The leavening agent becomes active at a temperature of about 180 degrees F. The quantity of dough and leavening agents are selected to produce a full rise of the product in the mold chamber side wall during the baking step so that the top of the product will come up to the underside of ring 66 of the upper mold pan as shown in FIG. 7. For the size of the bread cup above outlined, a dough ball of about 1¾ ounces is satisfactory.

The batter for a cake such as a yellow cake may be made by mixing sugar, cake flour (bleached), shortening with freshness preserver, non-fat dry milk, dried eggs, salt, mono and di-glycerides, leavening, artificial flavor (including vanilla), sodium silicoaluminate, sodium caseinate, artificial color and soya lecithin. The entire raising takes place in the oven as the leavening agent is selected to be active only at temperatures of about 180 degrees F. The oven is preheated to about 360 degrees F. and the cake is baked for about 13 minutes.

The outer walls of the core mold are greased with a standard cake pan coating so that the core mold will release from the cake after baking. Greasing the pan also produces a glaze on the bread or cake which also forms a surface more resistant to water penetration or penetration of liquid products used in filling the baked product.

The paper container is not greased thus eliminating one step in the baking process. The cake clings to the paper cup and this is a desirable characteristic so that the cake or bread will not be pulled out of the container when the core molds are removed.

The cake or bread product 56 as illustrated in FIGS. 3, 5, 6 and 7 has a substantially even top face 57, a porous structure as indicated by voids 58. Because the heat must reach the outer wall of the cake or dough through a paper wall which is a thermal insulator and the inner wall 59 of the cake or bread is in contact with a metal pan or heat conductor, there is a time lag between the heat of the oven reaching the outer wall and the inner wall. This time lag creates a unique product in which the inner wall surface and the portions next to it are more dense than the inner portions of the cake or bread. This greater density together with the slight glazing from the greased inner core pan creates an inner wall surface which is more impervious to liquids to prevent the cake or bread from becoming too soggy. In cakes which are to be filled with ice cream, it is extremely important that the liquid ice cream mix (which has the consistency of cake batter) not penetrate into the cake during the one minute it takes to freeze the ice cream.

Where the cup is made of breads and filled with liquid type hot foods it is apparent that the dense inside wall is critical in preventing the liquids from penetrating into the bread. Some of the hot foods which have been successfully served with either corn bread, white, whole wheat, boston brown or french breads formed in applicant's cup shape have been chile with meat, sloppy Joe's, beef stew, corn beef hash, chicken a la king, shrimp creole, sirloin tips, spoon burgers, frank and beans and others.

The liquid resistance of the inner wall has been great enough that the foods named above can be inserted into the cups, frozen, stored and then placed in warming ovens to thaw them and heat the contents and maintained for an hour or two before serving.

The outer wall surface of the cup-shaped bread or cake article is more dense than the inner portions of the article, but less dense than the inside wall. In effect there are three zones of density and this effect has been illustrated in FIG. 7 in which the inner wall is characterized by small voids 62, the inner portion has large voids 63 and the outer wall has intermediate size voids 64.

The difference in densities due to the time lag at which the product is baked in heightened by the very short time at which baking occurs; 10 to 14 minutes and the fact that the inner wall surface is actually subjected to baking for a longer time than the inner portion. As shown in FIG. 6, the batter or dough initially only partially fills the cup. As the heat reaches the batter or dough, the leavening agent is activated and the batter or dough begins to rise. The reservoir of dough or batter in the bottom of the cup begins to force the product up the sides of the cup. The batter or dough in contact with the metal core solidifies first and slides up the inner core wall. Pressure is created and the liquid batter or dough is forced up on the inner portion of the wall cavity. The heat reaching the dough or batter through the paper cup begins to solidify and bake the product next to the outer wall but the surface of the cup is not as slippery as the greased pan and the dough or cake tends to "crawl" up the surface wall of the paper.

This difference in density and imperviousness to liquids has been heretofore unachievable. In the present invention, only the inner wall is dense and more impervious to liquids and the major part or inner portions of the cake or bread remain moist and light which are the desirable characteristics of bread and cake.

An alternate form of the baking pan used for holding the paper container is shown in FIG. 4 through 7. The male core mold is similar in construction in all respects to the male mold previously described and here consists briefly of a top frame 41a openings 42a for receiving indexing stubs 44a and having tapered side walls 46a and bottom wall 47a. The female portion of the mold consists of a frame 71 having a plurality of cup-shaped recesses with tapered side walls 72 and a bottom wall 73 for receiving and indexing the container.

In order to use the same basic core mold pan, and because it is desirable to limit the raising of the cake or batter to different heights, the core mold may be provided with an annular ring 66. This ring by means of an annular depending shoulder 67 also serves to center the cup in the pans so that the wall thickness of the article will be uniform.

Paper cups which have a lid seat cannot be filled above the seat. A recently developed means of capping the cups, however, permits the paper cup to be filled to a point just below the lip of the cup itself. This new method consists of shrinking a transparent plastic film over the top of the cup.

Note in FIG. 7 that there is an air space between the bottom of the cup 68 and the pan as well as the outside wall 69 of the cup and the face of the pan. This dead air space further insulates the bottom and outside wall of the cake or bread from baking, further increasing the time lag in baking the inside and outside walls of the cake and further increasing the density of the inside wall of the product.

Since all raising of the dough or batter occurs in the high temperature oven, the effect of the paper termal insulator on the bottom of the cup should also be noted. The paper bottom of the cup, the dead air space at the bottom both act to insulate the reservoir of dough or batter in the bottom of the pan from baking as fast as the inside walls of the article. Thus, there is a continued flow from the reservoir up the walls. As stated before, the outer walls of the product are baked first and the dough or batter continues to rise in the inner portions of the wall. The voids are drawn with their axis elongated in a vertical direction to illustrate the actual voids in the baked product, which is caused by the raising of the dough and the flow during the baking process.

The apparatus for holding the metal core mold is constructed so that when it is inserted into the paper cup, there is a greater space between the core and the bottom of the cup than between the core and the walls of the cup. As an example, a bottom thickness of ½ inch and a side wall thickness of ¼ inch is suitable. The upper portions of the bottom wall are baked more thoroughly and are more dense than the inner portions of the bottm wall and the inside upper corners where the upstanding walls join the bottom wall are more dense than the inner portions of the walls and bottom due to the materials used and the method of baking. Referring to FIG. 5 through 7, note that the dough or batter is placed in the bottom of the paper cup so that it is centered in the cup. The male core mold is then inserted and the dough or batter is forced up the sides of the paper container to an approximately equal height all around. The dough or batter is only forced part way up the wall. The remainder of the rise occurs during the baking step only since there is no proofing time. The leavening agent only begins working during the baking cycle when the temperature of the dough or batter reaches about 180 degrees Fahrenheit.

As shown in FIG. 6, the dough or batter in contact with the bottom of the metal core pan begins to bake first since it is in direct contact with the hot metal pan and the dough or batter in the bottom portions of the paper cup remains cooler because of the insulating characteristics of the bottom of the cup and where it is baked in the pan of FIG. 6 there is also a dead air space which provides further insulation. As the reservoir of dough or batter in the bottom of the cup heats up above about 180 degrees F. the leavening agent causes expansion and the dough or batter crowds up against the dough or batter in contact with the bottom of the metal core mold. First, it compresses the baking dough or batter and then forces its way up the side walls between the core walls and the walls of the paper container. Since the walls are narrow and baking has already begun on the inside walls, there is a pressure exerted at the bottom of the cup. This compression also occurs at the inside upper corners of the product thereby forming a dense product at the corners and at the upper surface of the bottom wall of the cup which tends to reinforce and strengthen the cup and also to make the bottom portions of the cup more impervious to liquids.

The breads used in the above concept may be made without kneading the ingredients. Instead, the ingredients may be batter whipped in which the batter has the consistency approximating a pancake batter. The batter is scaled in the cups by automatic equipment and placed in the oven without proofing of the batter. The above batter contains a leavening agent which provides a growth in the oven only. There are many such leavening agents common to the trade.

I claim:

1. The method of making an edible food article in a non-edible cup-shaped paper container comprising:
   (a) filling said container having sufficient thickness and rigidity to function as a female mold for baking an edible cake or bread within, said container having an outer wall surface suitable for receiving markings made by the graphic arts and retaining said markings during baking and an inner wall to which a baked cake will cling slightly so that it will hold the cake while a core mold is being released and will also release from the wall by the action of a spoon; with a preselected quantity of raising dough or batter so as to form a cake or bread article in said container having bottom and side walls in contact with said container, said cake being formed with an open ended cavity with said walls diverging in the direction of said cavity, said base and walls having a thickness enabling quick baking;

(b) inserting a metal core member into said container in contact with said dough or batter forming a cup-shaped chamber with said container;

(c) baking said batter or dough for a pre-selected time until said resulting edible product substantially fills said chamber within a predetermined distance from the rim of said cup wherein the inner surface of said cake or bread article is characterized by a more thoroughly baked surface which is more dense providing a relatively greater resistance to liquid penetration than the interior portions of said cake or bread and the outer surface being characterized by a surface which is more thoroughly baked than the inner portions of said cake or bread but less thoroughly baked than said inner surface and less dense than said inner surface;

(d) supporting said paper container permitting direct oven heat against the bottom and side walls of said paper container;

(e) providing a metal annular ring between said upper end of said core member and said paper container wall so that the uppermost end of said baked article will be stopped by said ring and be subject to the heat of said metal ring to provide a final baking thereto; and (f) removing said core member from said container.

2. The method of making an edible food article in a non-edible cup-shaped paper container comprising:

(a) filling said container having sufficient thickness and rigidity to function as a female mold for baking an edible cake or bread within said container having an outer wall surface suitable for receiving markings made by the graphic arts and retaining said markings during baking and an inner wall to which a baked cake will cling slightly so that it will hold the cake while a core mold is being released and will also release from the wall by the action of a spoon, with a preselected quantity of raising dough or batter so as to form a cake or bread article in said container having bottom and side walls in contact with said container, said cake being formed with an open ended cavity with said walls diverging in the direction of said cavity, said base and walls having a thickness enabling quick baking;

(b) inserting a metal core member into said container in contact with said dough or batter forming a cup-shaped chamber with said container;

(c) baking said batter or dough for a pre-selected time until said resulting edible product substantially fills said chamber within a predetermined distance from the rim of said cup wherein the inner surface of said cake or bread article is characterized by a more thoroughly baked surface which is more dense providing a relatively greater resistance to liquid penetration than the interior portions of said cake or bread and the outer surface being characterized by a surface which is more thoroughly baked than the inner portions of said cake or bread but less thoroughly baked than said inner surface and less dense than said inner surface;

(d) surrounding said paper container by a metal female shield spaced from said paper container during baking creating a dead air space between said shield and said container to prevent direct flash heat from an oven thereby decreasing the possibility of scorching said paper container and decreasing baking time;

(e) providing a metal annular ring between said upper end of said core member and said paper container wall so that the uppermost end of said baked article will be stopped by said ring and be subject to the heat of said metal ring to provide a final baking thereto; and (f) removing said core member from said container.

References Cited

UNITED STATES PATENTS

| 1,852,830 | 4/1932 | Whitcomb | 229—1.5 |
| 2,510,211 | 6/1950 | Cleary | 229—15 |
| 2,890,958 | 6/1959 | Birnkrant | 99—88 |

LIONEL M. SHAPIRO, Primary Examiner

J. R. HOFFMAN, Assistant Examiner

U.S. Cl. X.R.

99—92